US006907232B2

(12) United States Patent
Suzuki et al.

(10) Patent No.: US 6,907,232 B2
(45) Date of Patent: Jun. 14, 2005

(54) RECEIVER AND RECEIVING SYSTEM AND METHOD

(75) Inventors: Keizo Suzuki, Iwaki (JP); Shigeru Sato, Iwaki (JP)

(73) Assignee: Alpine Electronics, Inc. (JP)

(*) Notice: Subject to any disclaimer, the term of this patent is extended or adjusted under 35 U.S.C. 154(b) by 367 days.

(21) Appl. No.: 10/133,055

(22) Filed: Apr. 26, 2002

(65) Prior Publication Data

US 2002/0177434 A1 Nov. 28, 2002

(30) Foreign Application Priority Data

Apr. 27, 2001 (JP) ....................................... 2001-130963

(51) Int. Cl.[7] .................................................. H04B 1/18

(52) U.S. Cl. ................................ 455/186.1; 455/154.1; 455/158.4

(58) Field of Search ................................ 455/550, 566, 455/150.1, 151.2, 154.1, 154.2, 156.1, 157.1, 157.2, 158.4, 158.5, 158.1, 159.1, 176.1, 180.1, 185.1, 186.1, 186.2

(56) References Cited

U.S. PATENT DOCUMENTS 5,214,792 A * 5/1993 Alwadish ................. 455/186.1
5,661,787 A * 8/1997 Pocock ..................... 455/186.1
5,857,149 A * 1/1999 Suzuki ..................... 455/186.1
6,292,676 B1 9/2001 Ozaki et al. ................ 455/566
6,628,928 B1 * 9/2003 Crosby et al. ........... 455/154.1
2002/0032019 A1 * 3/2002 Marks et al. ............ 455/186.2
2002/0151327 A1 * 10/2002 Levitt ......................... 455/556

* cited by examiner

*Primary Examiner*—Sonny Trinh
*Assistant Examiner*—Sam Bhattacharya
(74) *Attorney, Agent, or Firm*—Brinks Hofer Gilson & Lione

(57) ABSTRACT

A receiver and a receiving system capable of obtaining content related information corresponding to a retrieval key are provided. When a retrieval instruction is performed by a user, a retrieval key setting section sets the artist name of a musical piece provided by a program being received as a retrieval key. A related information retrieval section obtains program content data added to distribution information of another program, and retrieves content related information (for example, information such as the scheduled date of the sale of a new musical piece) corresponding to the retrieval key set by the retrieval key setting section. When the content related information corresponding to the retrieval key is extracted, a display processing section creates image data for displaying the extracted content related information and displays the image data on a display section.

19 Claims, 9 Drawing Sheets

FIG. 8

RETRIEVAL KEYWORD: OOOO

| | | | |
|---|---|---|---|
| 1 | SONG-A | — | HDD |
| 2 | LIVE AT TOKYO STADIUM | — | DVD |
| 3 | SONG-B | — | MD |
| 4 | NEW ALBUM ON SALE 2/21! TITLE ... | — | ST |
| 5 | AUTOBIOGRAPHY OF OOOO ON SALE! | DL | WEB |
| 6 | SONG-D | — | MC |
| 7 | SONG-E | — | CD |

RECEIVER AND RECEIVING SYSTEM AND METHOD

BACKGROUND OF THE INVENTION

1. Field of the Invention

The present invention relates to a receiver and to a receiving system and method for retrieving selected information distributed in a broadcasting format.

2. Description of the Related Art

Recently, digital broadcasting, wherein video signals and audio signals are converted into digital form, has been put into practical use. For example, CS (Communication Satellite) digital broadcasts, BS (Broadcasting Satellite) digital broadcasts, and digital broadcasts such as digital audio broadcasting (DAB) in Europe, have been used. Digital broadcasts have various advantages, such as video and audio being formed with high quality, multiple channels and the distribution of various types of incidental information concerning programs being broadcast.

Generally, digital broadcasts contain incidental information related to the content of the program in addition to program information such as video and audio. Thus, when viewing a program, it is possible to view information related to the content of the program and to retrieve broadcasting channels which are broadcasting a program of a similar genre to the presently viewed program or a program of the same performer.

However, where one wishes to obtain related information corresponding to a particular artist A (artist A), the user must perform the following operation: (1) retrieve broadcasting channels which are broadcasting a program related to the artist A; (2) designating each broadcasting channel that has been retrieved; and (3) displaying the information related to artist A on the basis of the incidental information added to the distribution information of the designated broadcasting channel. Conventionally, it is inconvenient for a user to collect content related information in multiple broadcast channels.

SUMMARY OF THE INVENTION

An object of the present invention is to provide a receiver and a receiving system capable of easily obtaining content related information corresponding to a retrieval key. Where related information corresponding to a retrieval key is retrieved by using distribution information of a plurality of broadcasting channels received as targets (sources of information), the receiving section receives the distribution information containing program information and incidental information related to the content of the program information. When a retrieval key is specified by the operation section of the receiver, the retrieval section designates a broadcasting channel having the incidental information containing the retrieval key and retrieves the content related information contained in the incidental information corresponding to the broadcasting channel. The display section displays the content related information retrieved from the incidental information corresponding to one or more broadcasting channels. By specifying a retrieval key, related information corresponding to the retrieval key is retrieved from within the incidental information corresponding to one or more broadcasting channels and the contents thereof are displayed. Thus, it is possible to easily obtain the content related information corresponding to the predetermined retrieval key from multiple broadcasting channels.

Preferably, the retrieval section retrieves one or more broadcasting channels in which a retrieval key is contained in the incidental information by using the specified retrieval key, and retrieves content related information contained in each of these broadcasting channels. By retrieving broadcasting channels in which the retrieval key is contained in the incidental information and by checking the incidental information corresponding to these broadcasting channels, it is possible to efficiently collect the content related information corresponding to the retrieval key.

In the above-described incidental information, preferably the name of an artist and the related information corresponding to works of the artist are contained. Further, when the name of the artist is specified as a retrieval key, the display section displays the works of the artist. As a result, by simply specifying the name of the artist, it is possible to easily obtain information on the works of the artist.

The receiving system of the present invention may comprise, in addition to the above-described receiver, an external device including a storage medium having incidental information stored thereon. After the retrieval section retrieves the related information by using the distribution information received by the receiver as a target, the retrieval section retrieves the related information by using the incidental information stored on the storage medium within the external device as a target. As a result of using the incidental information stored on the storage medium within the external device, a larger amount of related information can be collected.

In the receiving system of a preferred embodiment of the present invention, the receiver is connected to a database containing the incidental information via a predetermined network, and after the retrieval section retrieves the related information by using the distribution information received by the receiver as a target, the retrieval section retrieves the related information by using the database as a target. Generally, since databases which are connected via a network, such as the Internet, have stored therein a variety of types of data, by specifying the database as a retrieval target, various kinds of related information can be collected.

The receiving system of a preferred embodiment of the present invention may comprise, in addition to the receiver, an external device including a storage medium on which incidental information is stored, and the receiver may be connected to a database containing incidental information via a predetermined network. After the retrieval section retrieves the related information by using the distribution information received by the receiver as a target, the retrieval section retrieves the related information by using the incidental information stored on the storage medium within the external device as a target, and further retrieves the related information by using the database as a target. In the manner described above, by using an external device and a database which is connected via a network as a retrieval target, a larger amount of useful related information can be collected.

In a case where the related information is retrieved by using an external device and a database which is connected via a network, preferably, the display section displays the related information retrieved by the retrieval section in the retrieval sequence each time of the retrieval. Also, when a time difference until a retrieval result is obtained occurs due to the difference in the retrieval target, by displaying the retrieved related information in the retrieval sequence each time of the retrieval, it is possible to quickly provide the related information to a user.

The receiving system may further comprise a confirmation section for asking a user to confirm the capability of a retrieval before related information is retrieved by using a database as a target when a payment obligation of a fee occurs during communication via a network. Preferably, the retrieval section retrieves the related information by using the database as a target when the execution of a retrieval is instructed by the confirmation section. As a result, it is possible for the user to select whether he or she wishes to retrieve the related information by using an external database as a target if it will require payment of a communication fee.

The receiving system may further comprise a confirmation section for asking a user to confirm the capability of a retrieval of the related information using the database as a target before a payment obligation of an additional fee occurs in a case where a free charge or a fixed charge is set regarding within a predetermined range and a payment obligation of an additional fee occurs when this predetermined range is exceeded during communication via the network. In a case where the predetermined range is exceeded, preferably, the retrieval section retrieves the related information by using the database as a target only when a retrieval has been instructed by the confirmation section. As a result, it is possible for the user to select whether he or she wishes to retrieve the related information by using an external database if it will require payment of an additional fee.

BRIEF DESCRIPTION OF THE DRAWINGS

FIG. 8 shows an example of the display of the related information; and

DESCRIPTION OF THE PREFERRED EMBODIMENTS

Figure 1:
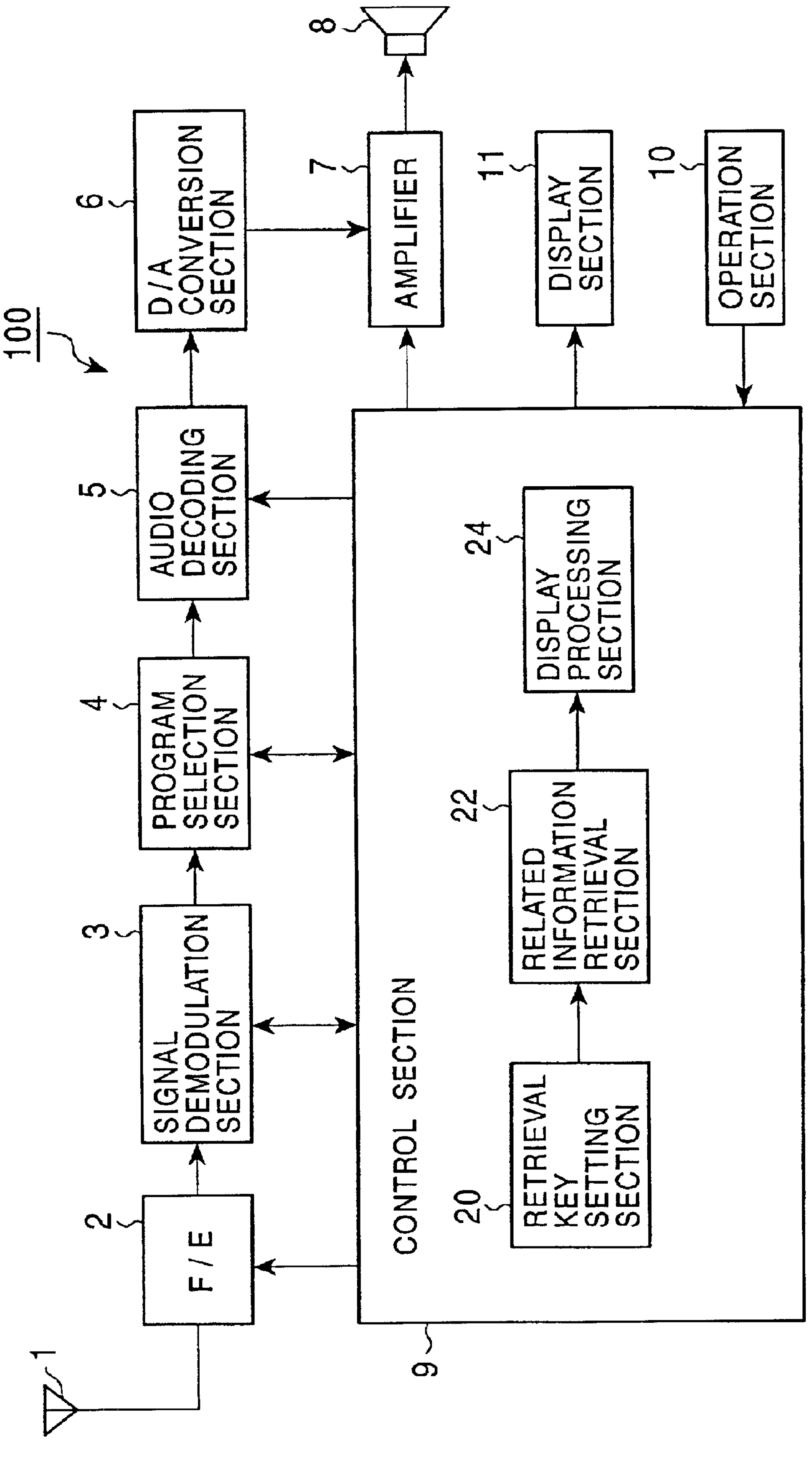
FIG. 1 shows the construction of a receiver according to a first embodiment of the present invention.

FIG. 1 depicts a receiver according to a first embodiment of the present invention, which receives a digital audio broadcast. Receiver 100 includes an antenna 1, a front-end (F/E) section 2, a signal demodulation section 3, a program selection section 4, an audio decoding section 5, a digital-to-analog (D/A) conversion section 6, an amplifier 7, a speaker 8, a control section 9, an operation section 10, and a display section 11.

The front-end section 2 extracts components of a receiving frequency corresponding to a desired broadcasting channel from the signals received via the antenna 1, and performs frequency conversion on these extracted signals in order to output an intermediate frequency signal.

The signal demodulation section 3 converts the intermediate frequency signal output from the front-end section 2 into digital data and performs a predetermined demodulation process on the data, thereby demodulating transmission data.

The program selection section 4 performs a deinterleaving process on the transmission data outputted by the signal demodulation section 3 in order to reconstruct the original data sequence. Next, the program selection section 4 performs a predetermined error detection and correction process, reconstructs program information (i.e. audio data compressed by a predetermined method) corresponding to a plurality of programs, and extracts the program information corresponding to one program in accordance with an instruction from the control section 9.

The audio decoding section 5 performs a decompression process on the program information outputted by the program selection section 4 in order to reconstruct the audio data, and outputs the reconstructed audio data to the digital-to-analog conversion section 6. The digital-to-analog conversion section 6 converts the audio data outputted by the audio decoding section 5 into an analog signal.

The amplifier 7 amplifies the analog signal output from the digital-to-analog conversion section 6 in accordance with an instruction from the control section 9, and outputs the signal to the speaker 8. The speaker 8 outputs audio corresponding to the amplified audio signal.

The control section 9 controls the operation of the receiver 100. Specifically, the control section 9 performs processes, such as a station selection instruction for selecting a broadcasting channel and volume adjustment of audio outputted by the speaker 8. The details of a retrieval key setting section 20, a related information retrieval section 22, and a display processing section 24, provided inside the control section 9, are described below.

The operation section 10 allows a user to perform various operation instructions, such as a selection of a broadcasting channel, and has various operation keys. The display section 11 displays information such as, the program being received or the status of the operation by the user.

Described below are the contents of a digital broadcast received by the receiver 100 of this embodiment. The distribution information contains program information and incidental information. As noted above, program information typically contains audio and video data, while incidental information contains other predetermined program content data.

Figure 2:
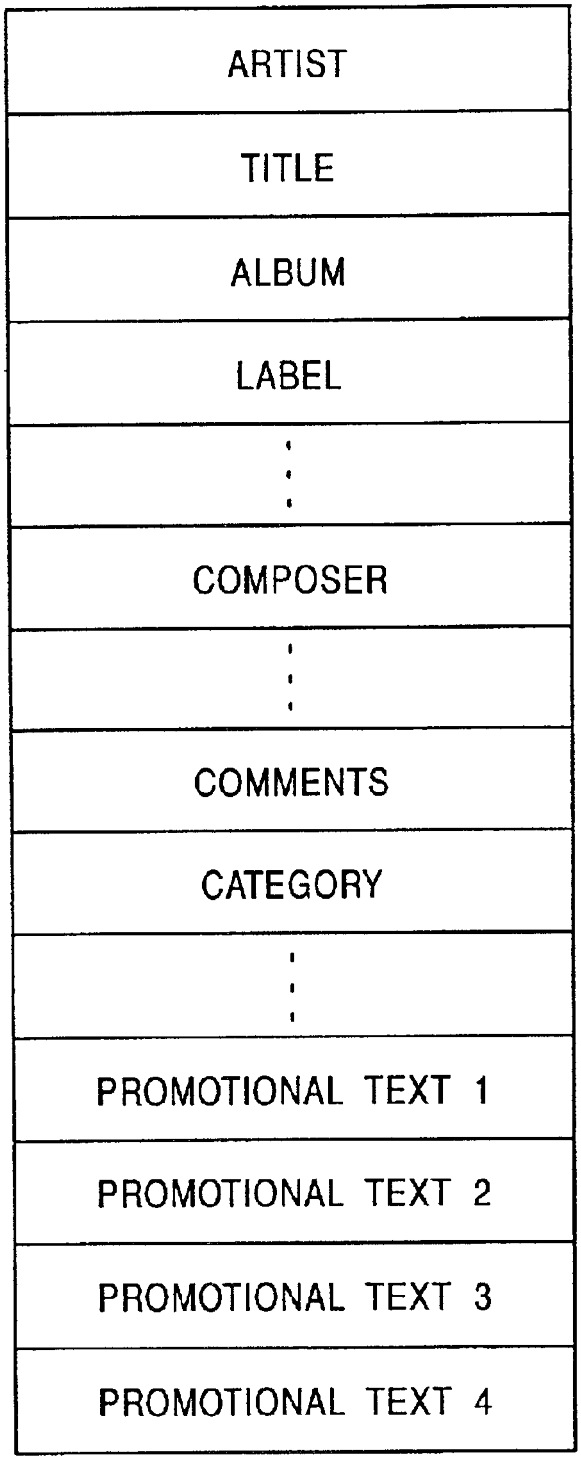
FIG. 2 shows the detailed contents of program content data contained in distribution information.

FIG. 2 shows an example of incidental information contained in distribution information. As shown in FIG. 2, this program content data may contain data, such as:

a. "Artist" indicating the name of an artist who sings or performs a musical piece which is broadcast in a program;

b. "Title" indicating the title of the musical piece;

c. "Album" indicating the name of the album on which the musical piece is recorded;

d. "Label" indicating the source company of the musical piece (or the album on which this musical piece is recorded);

e. "Composer" indicating the producer of the musical piece;

f. "Comments" which are various types of information added to the musical piece as desired; and g. "Promotional Texts 1 to 4" which are messages that are added as desired, and in which information, such as the activities (for example, the schedule of the sale of the new musical piece, and the holding schedule of a concert) of the artist.

Referring back to FIG. 1, if a predetermined retrieval instruction is given by a user when a program is being received, the retrieval key setting section 20 within the control section 9 sets a retrieval key for retrieving information related to a program being received at that time. For example, the name of the artist may be used as the retrieval key.

The related information retrieval section 22 retrieves related information corresponding to the retrieval key set by the retrieval key setting section 20. Specifically, the related information retrieval section 22 obtains program content data, see e.g. FIG. 2, and retrieves related information corresponding to the retrieval key from within the data which is mainly stored in the "Comments" and "Promotional Text".

The display processing section 24 performs a process for creating an image displayed on the display section 11. When various types of related information are collected by the related information retrieval section 22, an image by which the contents are displayed is created.

The antenna 1, the front-end section 2, the signal demodulation section 3, the program selection section 4, and the control section 9 correspond to the receiving section. The retrieval key setting section 20 and the related information retrieval section 22 correspond to the retrieval section. The display section 11 and the display processing section 24 correspond to the display section.

Figure 3:
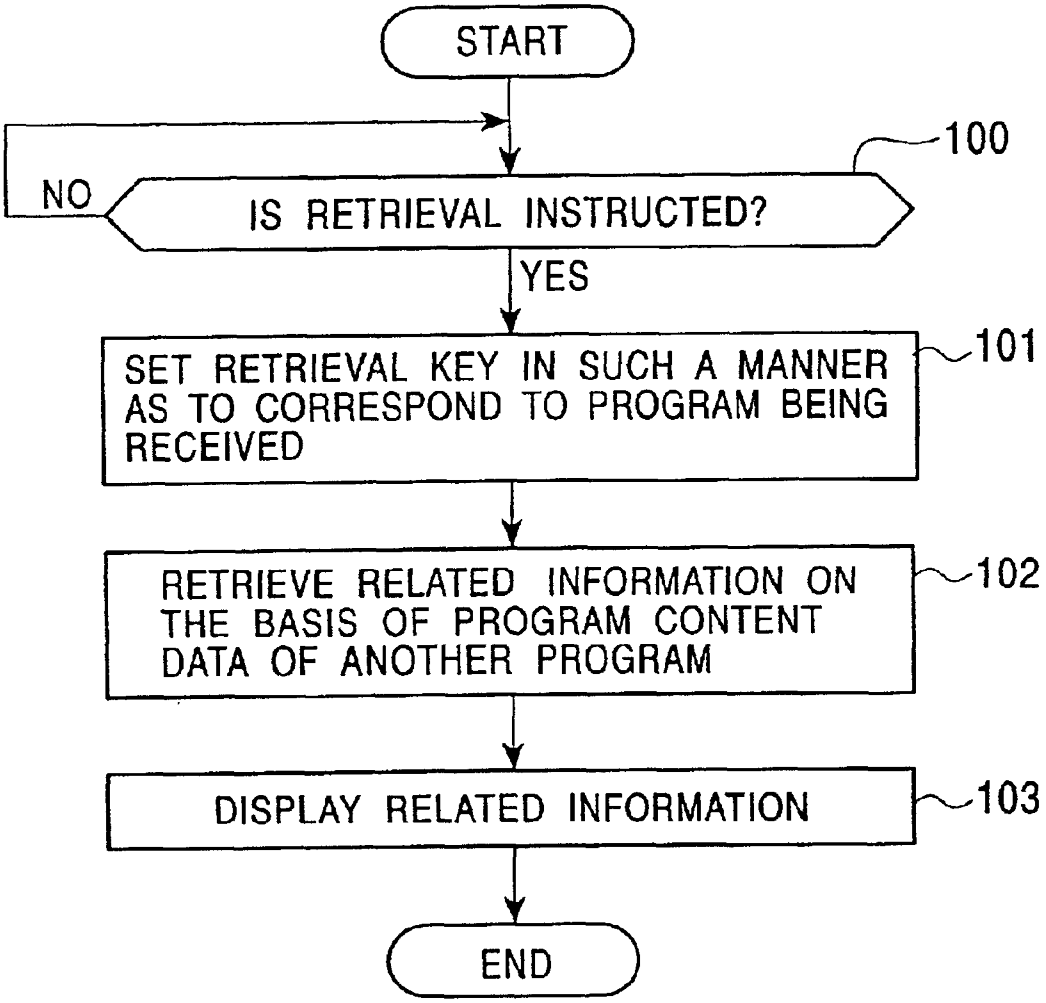
FIG. 3 is a flowchart showing the operation procedure of the receiver when a retrieval key is set based on a program being received and related information is retrieved on the basis of this retrieval key.

FIG. 3 depicts a flowchart showing the operation procedure of the receiver 100 where a retrieval key is set based on a program being received and related information is retrieved on the basis of this retrieval key.

The retrieval key setting section 20 within the control section 9 determines whether a predetermined retrieval instruction is performed by a user (act 100). When the retrieval instruction is performed, a YES determination is made, and a retrieval key is set in such a manner as to correspond to the program being received (act 101). For example, the name of the artist of a musical piece provided may be designated on the basis of the program content data, and this artist name may be set as the retrieval key.

When the retrieval key is set by the retrieval key setting section 20, the related information retrieval section 22 obtains program content data of another program, and retrieves related information corresponding to the retrieval key (act 102). As described above, based on the program content data on another program, related information corresponding to the retrieval key is extracted from within, such as, "Comments" and "Promotional Text".

When the related information is extracted based on the retrieval key, the display processing section 24 creates image data for displaying the contents of the extracted related information, and displays the image data on the display section 11 (act 103).

Figure 4:
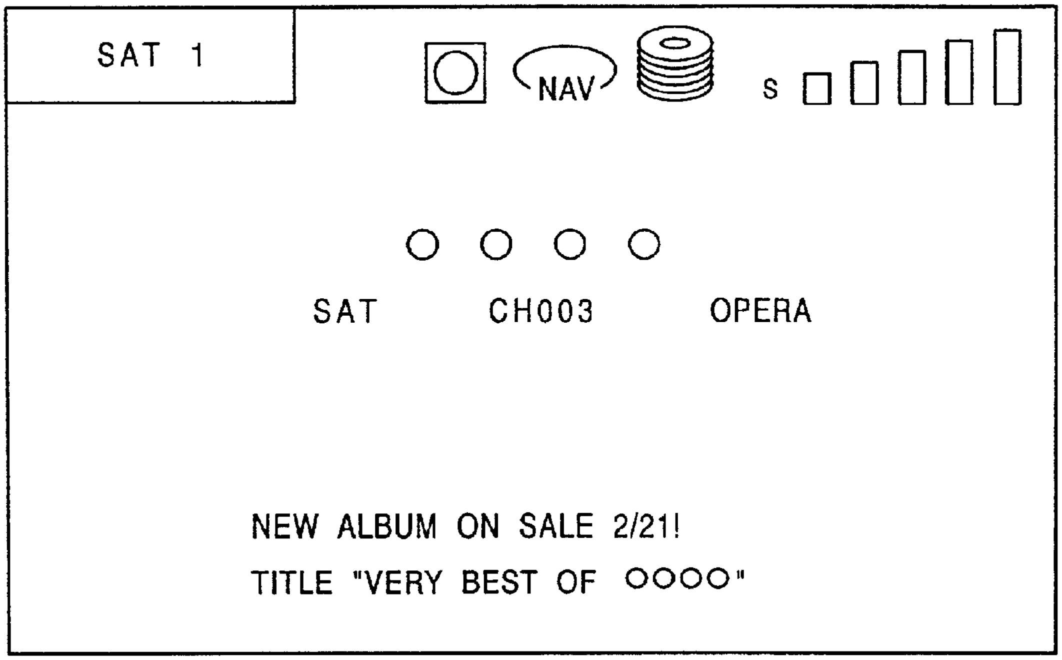
FIG. 4 shows an example of the display of the related information.

FIG. 4 shows an example of the display of the related information. As shown in FIG. 4, in a case where a program of channel 3 (CH003) is being received and the artist of the musical piece provided by this program is "○○○○", related information is extracted from within the program content data of another program by using this artist name "○○○○" as the retrieval key. In the example shown in FIG. 4, as the related information of the artist "○○○○", activities, such as the sale date of the new album and the title, are extracted, and the contents are shown in the lower portion of the screen. If a large amount of related information that cannot be displayed on one screen is extracted, the other related information is displayed in sequence automatically or by performing a predetermined operation instruction using the operation section 10.

When a predetermined retrieval instruction is given by a user while a program is being received, the receiver 100 of the first embodiment sets a retrieval key, e.g. an artist name, on the basis of the content of the program being received at that time, retrieves related information corresponding to the retrieval key from within the program content data (incidental information) contained in the distribution information of another receivable broadcasting channel, and displays the contents. Therefore, the related information corresponding to the retrieval key can be easily obtained.

As described above, a retrieval process based on a retrieval key may be performed by using the distribution information of a plurality of broadcasting channels, received by the receiver, as a target in order to retrieve related information. In addition to the broadcasting channel received by the receiver, related information may be retrieved by using various external devices and external databases as targets.

Figure 5:
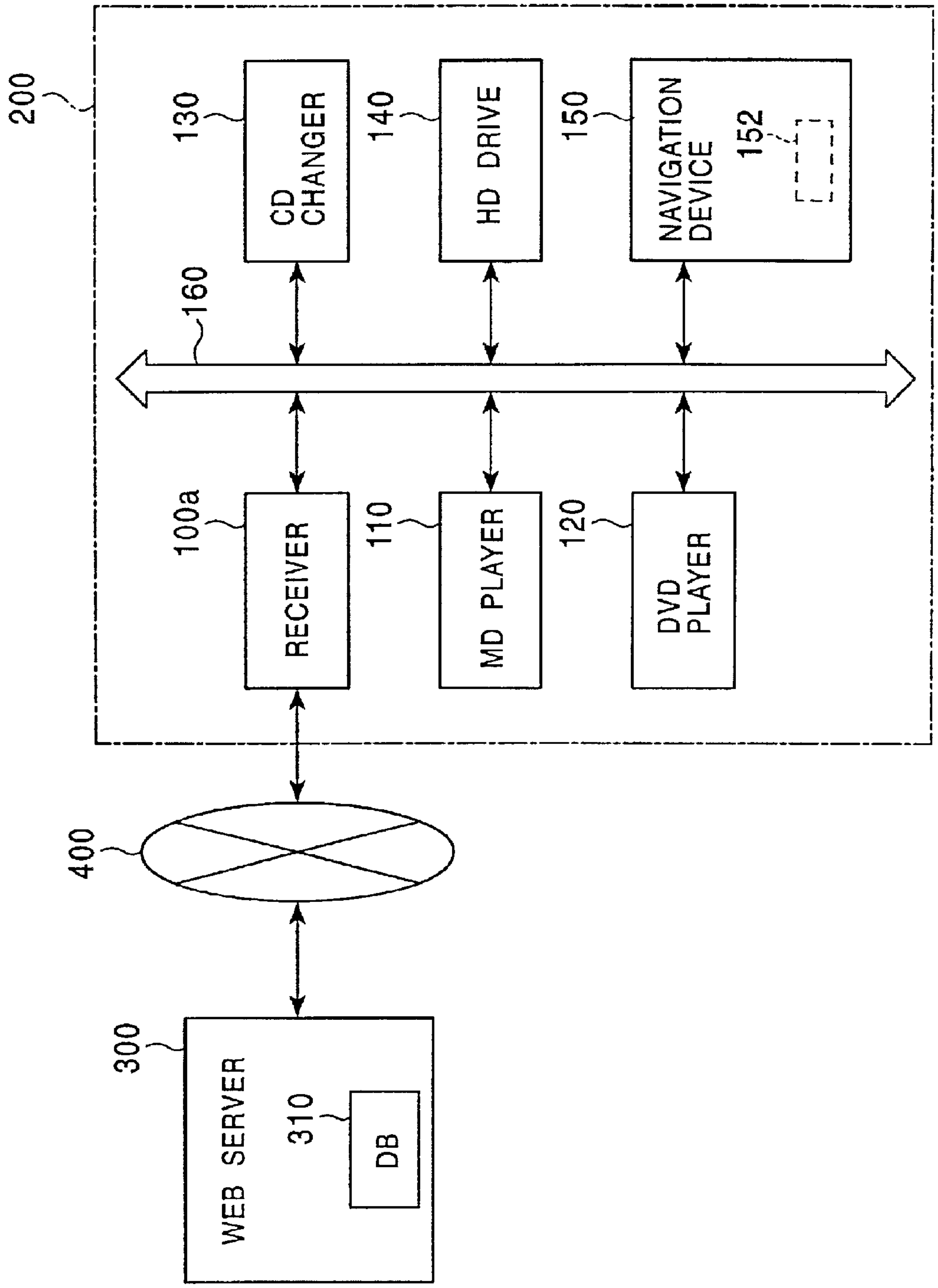
FIG. 5 shows the configuration of a receiving system according to a second embodiment of the present invention.

FIG. 5 shows the configuration of a receiving system according to another embodiment of the present invention. A receiving system 200 comprises a receiver 100*a*, an MD (Mini Disk) player 110, a DVD (Digital Versatile Disk) player 120, a CD (Compact Disk) changer 130, an HD (Hard Disk) drive 140, and a navigation device 150. These devices are interconnected to each other via a bus 160. The receiving system 200 can be connected to a web server 300 via a predetermined network 400. The receiving system 200 is connected to the network 400 via a mobile phone (not shown).

The receiver 100*a* receives a digital broadcast and retrieves related information on the basis of a predetermined retrieval key in a manner similar to the receiver 100 of the above-described first embodiment. Further, the receiver 100*a* of this embodiment also controls the operation of each of the MD player 110, the DVD player 120, and the CD changer 130 on the basis of an operation instruction performed by a user, obtains video and audio played back by each device via the bus 160, and performs video display and audio output.

The receiver 100*a* also plays back compressed musical data, such as MP3 (MPEG1 Audio Layer-3) files, and can obtain the compressed musical data from a memory card 152 loaded into the navigation device 150 in order to perform audio output. The detailed construction of the receiver 100*a* will be described later.

The MD player 110 plays back a musical piece recorded on an MD and transmits the playback data to the receiver 100*a* via the bus 160.

The DVD player 120 plays back video and audio recorded on a DVD and transmits the playback data to the receiver 100*a* via the bus 160.

The CD changer 130 is capable of loading a plurality of CDs. The CD changer 130 plays back a musical piece recorded on one of the CDs and transmits the playback data to the receiver 100*a* via the bus 160.

The HD drive 140 stores compressed musical data, such as MP3files, and various types of data (for example, sightseeing information) used in the navigation device 150.

The navigation device 150 performs a predetermined navigation process, such as a map display process and a route searching/guidance process, and the memory card 152, which is a portable storage medium, can be loaded into the navigation device 150. In this embodiment, a display screen, e.g., a map image, created by the navigation device 150 is transmitted to the receiver 100*a* via the bus 160, so that the map image is displayed on the display section provided in the receiver 100*a*. The navigation device 150 of this embodiment can externally obtain various types of data by using the memory card 152.

The web server 300 shown in FIG. 5 is used to set up a website for providing various types of information on the Internet, and has a database (DB) 310 in which various types of information are stored.

Figure 6:
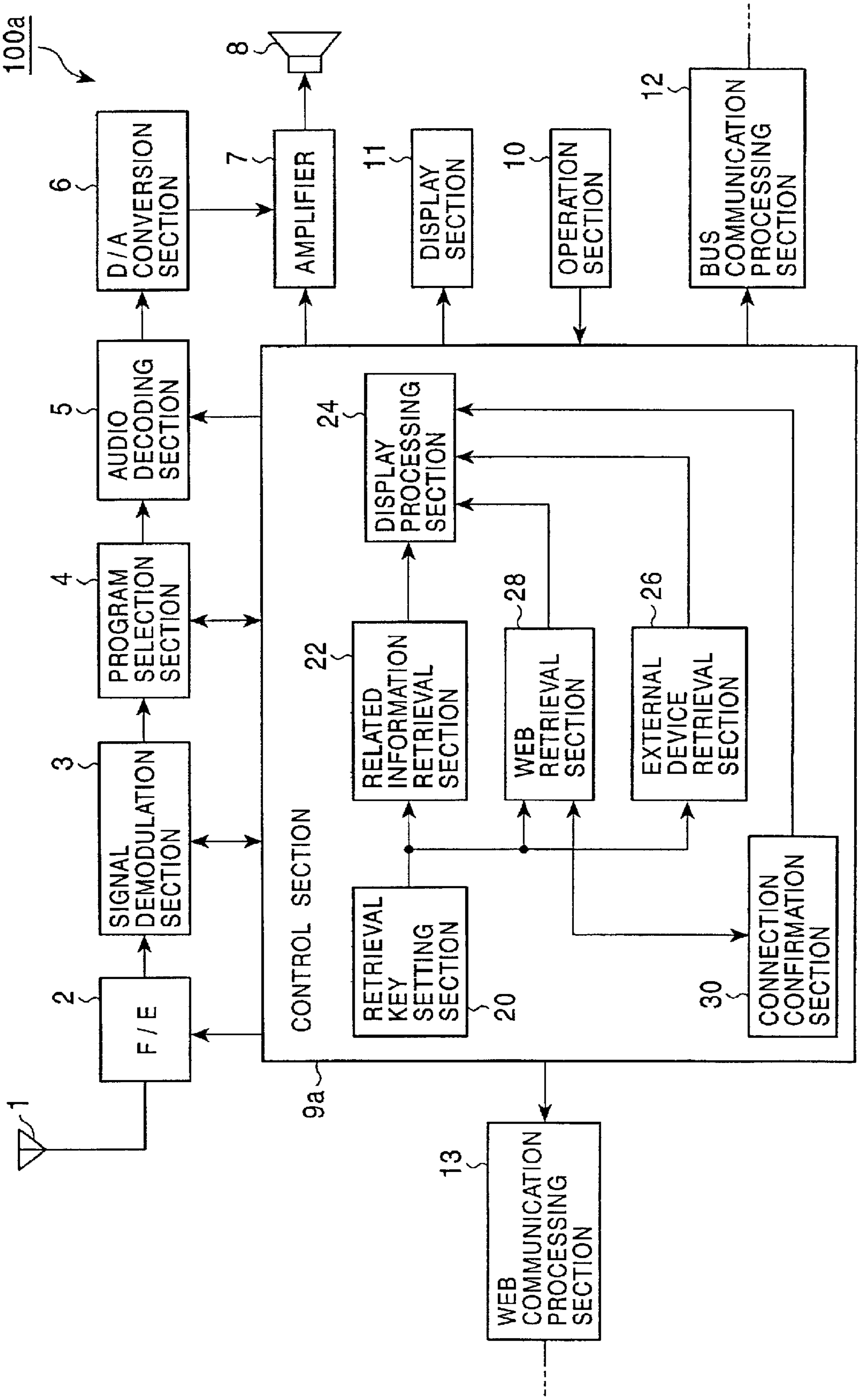
FIG. 6 shows the construction of a receiver according to the second embodiment of the present invention.

FIG. 6 shows the construction of the receiver 100*a* of this embodiment. The receiver 100*a* shown in FIG. 6 basically has the same construction as that of the receiver 100 of the above-described first embodiment. The receiver 100*a* comprises an antenna 1, a front-end (F/E) section 2, a signal demodulation section 3, a program selection section 4, an audio decoding section 5, a digital-to-analog (D/A) conversion section 6, an amplifier 7, a speaker 8, a control section 9*a*, an operation section 10, a display section 11, a bus communication processing section 12, and a web communication processing section 13.

The control section 9*a* controls the operation of the receiver 100*a*, performs operation control of an external device such as the MD player 110 and performs the process of playing back compressed musical data, such as MP3 files. The control section 9*a* comprises a retrieval key setting section 20, a related information retrieval section 22, a display processing section 24, an external-device retrieval section 26, a web retrieval section 28, and a connection confirmation section 30.

The external-device retrieval section 26, which is connected to an external device, such as the MD player 110, via the bus communication processing section 12, performs a process of retrieving related information corresponding to a retrieval key by using an external device as a target on the basis of the retrieval key which is set by the retrieval key setting section 20.

Specifically, the external-device retrieval section 26 retrieves related information corresponding to the retrieval key from within the TOC (Table of Contents) information recorded on an MD loaded into the MD player 110. Furthermore, the external-device retrieval section 26 also retrieves related information corresponding to the retrieval key by the same method as for the MD with regard to a DVD loaded into the DVD player 120 and a CD loaded into the CD changer 130. In addition, in a case where compressed musical data is stored in the HD drive 140 or in the memory card 152 loaded into the navigation device 150, the external-device retrieval section 26 retrieves related information corresponding to the retrieval key on the basis of tag information (containing information related to the musical piece, such as the title of the musical piece and the artist name) added to the compressed musical data.

The web retrieval section 28, which is connected to the web server 300 via the web communication processing section 13, retrieves related information corresponding to the retrieval key from within various types of information stored in a DB 310.

The connection confirmation section 30 performs a process for asking a user to confirm the capability of the execution of a retrieval process when the web retrieval section 28 performs a retrieval of the related information corresponding to the retrieval key. When communication via the network 400 is to be performed, an obligation of payment, such as a communication fee and a connection fee to an Internet provider, may occur. Therefore, prior to the process by the web retrieval section 28, the connection confirmation section 30 displays a message for inquiring whether a retrieval of information is performed using the web server 300 as a target on the display section 11, so that the capability of the retrieval process is confirmed by the user. When the execution of the retrieval process is instructed from the user, the connection confirmation section 30 permits the web retrieval section 28 to perform the retrieval process.

The operation section 10 shown in FIG. 6 allows a user to perform various operation instructions to the receiver 100*a*, such as a selection of a broadcasting channel and to perform various operation instructions to an external device such as the MD player 110, and has various operation keys.

The display section 11 displays items such as, the information on a program being received, the status of the operation by the user, the operating status of an external device, and a map image created by the navigation device 150.

The bus communication processing section 12 performs a communication process allowing the control section 9*a* to transmit and receive data with an external device, such as the MD player 110, via the bus 160.

The web communication processing section 13 performs a communication process allowing the control section 9*a* to transmit and receive data with the web server 300 via the network 400.

The bus communication processing section 12, the web communication processing section 13, the related information retrieval section 22, the external-device retrieval section 26, and the web retrieval section 28 correspond to the retrieval section. The MD player 110, the DVD player 120, the CD changer 130, the HD drive 140, and the navigation device 150 correspond to the external device. The connection confirmation section 30 corresponds to the confirmation section.

Figure 7:
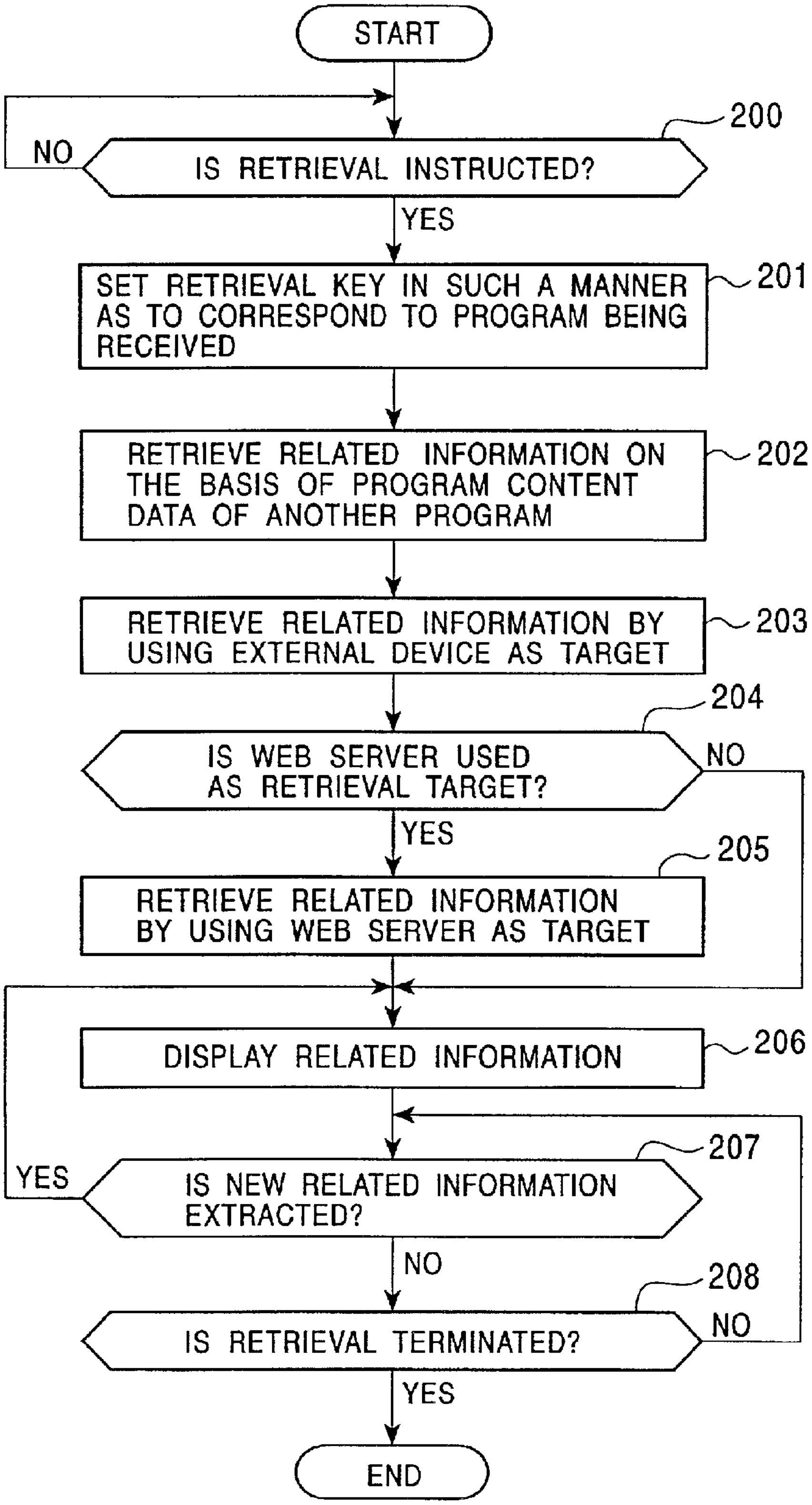
FIG. 7 is a flowchart showing the operation procedure of the receiver when a retrieval key is set based on a program being received and related information is retrieved on the basis of this retrieval key.

FIG. 7 is a flowchart showing the operation procedure of the receiver 100*a* when a retrieval key is set based on a program being received and related information is retrieved on the basis of this retrieval key.

The retrieval key setting section 20 within the control section 9*a* determines whether a predetermined retrieval instruction is performed by a user (act 200). When a retrieval instruction is performed, a YES determination is made, and a retrieval key is set in such a manner as to correspond to the program which is being received (act 201). Similarly to the above-described first embodiment, the artist name of the musical piece provided by the program being received is specified on the basis of the program content data, and this artist name is set as the retrieval key.

When the retrieval key is set by the retrieval key setting section 20, the related information retrieval section 22 obtains the program content data of another program, and retrieves the related information corresponding to the retrieval key (act 202).

The external-device retrieval section 26 retrieves related information corresponding to the retrieval key by using an external device such as the MD player 110 as a target (act 203).

The connection confirmation section 30 displays a predetermined message on the display section 11, so that a determination is made as to whether the related information corresponding to the retrieval key is retrieved by using the web server 300 as a target on the basis of the operation instruction performed by the user (act 204).

When it is instructed by the user that a retrieval is performed by using the web server 300 as a target, a YES determination is made in act 204, and the connection confirmation section 30 notifies the web retrieval section 28 that the retrieval process is permitted. The web retrieval section 28 receiving the notification retrieves the related information corresponding to the retrieval key by using the web server 300 as a target (act 205).

When it is instructed by the user that the web server 300 is not used as a target, a NO determination is made in act 204. In this case, the process shown in act 205 is not performed.

When the related information corresponding to the retrieval key is retrieved, the display processing section 24 creates image data for displaying the contents of the extracted related information, and displays the image data on the display section 11 (act 206). In this embodiment, even if the retrieval process by each retrieval section (the related information retrieval section 22, the external-device retrieval section 26, and the web retrieval section 28) is not completely terminated, the extracted related information is displayed in sequence.

Next, the display processing section 24 determines whether new related information is extracted by each retrieval section (act 207). When new related information is extracted, a YES determination is made in act 207, and the display processing section 24 returns to the above-mentioned act 206, where the newly extracted related information is added and displayed.

When the new related information is not extracted, a NO determination is made in act 207, and the display processing section 24 determines whether or not the retrieval process by each retrieval section has been completed (act 208). When the retrieval process by each retrieval section has not been completed, a NO determination is made in act 208. In this case, the process returns to act 207, and processes of act 207 and subsequent acts are repeated.

When the retrieval process by each retrieval section is completed, a YES determination is made in act 208. In this case, the series of processes is terminated.

FIG. 8 shows an example of the display of related information, in which related information is extracted by using the artist name "○○○○" as a retrieval key. As shown in FIG. 8, the related information is displayed by being formed into a list in the extracted sequence. For example, the first related information of the list shows that the compressed musical data of the musical piece "Song-A" is stored in the HD drive 140 (in the figure, displayed as "HDD"). Similarly, the second related information of the list shows that a DVD in which the state of affairs of a concert (live) is recorded is loaded into the DVD player 120 (in the figure, displayed as "DVD").

The same applies to the other lists. "ST" in the figure shows related information extracted on the basis of the program content data received by the receiver 100*a*. "MD" shows related information extracted from an MD loaded into the MD player 110. "CD" shows related information extracted from a CD loaded into the CD changer 130. "WEB" shows related information extracted from the web server 300. "MC" shows related information extracted from the memory card 152. Furthermore, the fifth related information of the list is extracted from the web server 300 and the information that more detailed information can be downloaded with respect to this related information is displayed by the display "DL". Furthermore, as described above, for the list of the related information, each time each piece of related information is newly extracted, a list item is added in sequence and the display contents are updated. In a case where a large amount of related information which cannot be displayed on one screen is extracted, by performing a predetermined operation instruction using the operation section 10, and other related information is displayed.

Figure 9:
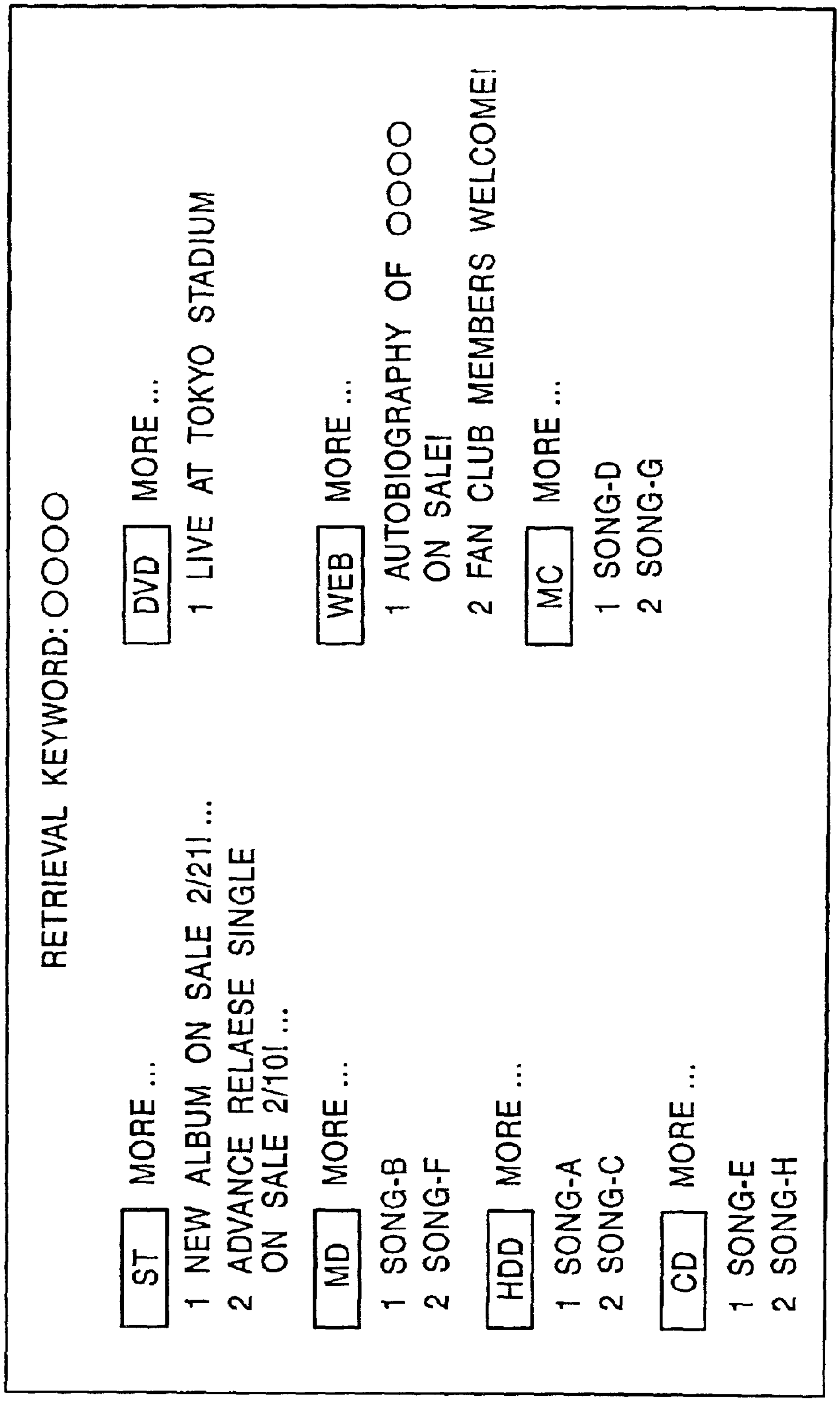
FIG. 9 shows another example of the display of the related information.

FIG. 9 shows another example of the display of the related information. As shown in FIG. 9, the related information is classified according to a category of the retrieval target, and two or three pieces of related information are shown for each category. Furthermore, by specifying a desired category by performing a predetermined operation using the operation section 10, a still larger amount of related information belonging to that category can be viewed.

In the manner described above, in the receiving system 200 when a predetermined retrieval instruction is given from a user while a program is being received, a predetermined retrieval key is set on the basis of the content of the program being received at that time, related information corresponding to the retrieval key is retrieved from within program content data (incidental information) contained in the distribution information of another receivable broadcasting channel, related information corresponding to the retrieval key is retrieved by using an external device such as the MD player 110 or the web server 300 which is connected via or the network 400 as a retrieval target, and the content of the extracted related information is displayed. Therefore, it is possible to easily obtain the related information corresponding to a retrieval key. In particular, in addition to the distribution information of another broadcasting channel, since an external device such as the MD player 110 or the web server 300 which is connected via a network is used as a retrieval object, there is an advantage that various kinds of related information can be extracted with a simple operation.

The present invention is not limited to each of the above-described embodiments, and various modifications are possible within the spirit of the present invention. For example, in each of the above-described embodiments, when a predetermined retrieval instruction is given, the retrieval key setting section 20 sets the artist name of the musical piece provided by a program being received at that time as a retrieval key. However, the contents of the retrieval key are not limited to this. Furthermore, the contents of the retrieval key may be set as desired by a user by using the operation section 10.

In the embodiments utilizing receiver 100*a*, a retrieval key is set based on the program content data of a broadcasting channel which is received by the receiver 100*a*, and related information is retrieved. However, the related information may be retrieved on the basis of the operation status of another external device. For example, when a musical piece recorded on an MD is being played back by the MD player 110, a retrieval key, such as the artist name, may be set based on the incidental information of this musical piece, and a retrieval process for the related information is performed. Similarly, when a process by the navigation device 150 is being performed, for example, the name of the region corresponding to the position of a vehicle may be set as a retrieval key, and related information (for example, the sightseeing information stored in the HD drive 140, etc.) is retrieved.

In the above-described embodiments, when it is determined whether the web server 300 is used as a retrieval object, an operation instruction from a user is requested each time thereof. However, whether the web server 300 is used as a retrieval object may be set in advance by the user.

Furthermore, in the these embodiments, assuming a case in which an a payment obligation of a fee occurs during communication via the network 400, a predetermined confirmation process of whether the web server 300 is used as a retrieval target is performed by the connection confirmation section 30. However, during communication via the network 400, in a case where a free charge or a fixed charge is set regarding within a predetermined range and a payment obligation of an additional fee occurs when this predetermined range is exceeded, a confirmation process by the connection confirmation section 30 may be performed before the payment obligation of an additional fee occurs. In this case, a predetermined range in which a payment obligation of an additional fee does not occur may be set in the connection confirmation section 30, and when a retrieval using the web server 300 as a target is to be performed, the connection confirmation section 30 may determine as to whether a payment obligation of an additional fee occurs. When the payment obligation of an additional fee occurs, a predetermined confirmation screen is displayed so that the intention of the user is confirmed.

In each of the above-described embodiments, a case in which a digital audio broadcast is received is assumed. However, the present invention is not limited to this case, and can be similarly applied to a case in which various broadcasts, such as a BS digital broadcast and a CS digital broadcast, are received.

In each of the above-described embodiments, a case of an on-vehicle receiver and an on-vehicle receiving system is assumed. However, the to applicable scope of the present invention is not limited to these, and the present invention can also be applied to a household receiver and a household receiving system.

The present discussed embodiments demonstrate that where related information corresponding to a retrieval key using the distribution information of a plurality of broadcasting channels, received by a receiver, as a target, is retrieved, the related information corresponding to the retrieval key may be retrieved from incidental information corresponding to one or more broadcasting channels by simply specifying the predetermined retrieval key, and the contents are displayed. Therefore, it is possible to easily obtain the related information corresponding to the predetermined retrieval key.

What is claimed is:

1. A receiver for retrieving content related information from a plurality of broadcasting channels, said receiver comprising:

a receiving section operable to receive distribution information containing program information and incidental information from said plurality of broadcasting channels;

an operation section operable to designate retrieval key information corresponding to a retrieval key inputted by a user;

a retrieval section operable to identify broadcasting channels with incidental information containing said retrieval key information, retrieve one or more broadcasting channels with incidental information containing said retrieval key information, and retrieve content related information from said one or more broadcasting channels with incidental information containing said retrieval key information; and a display section operable to display content related information;

a confirmation section operable to ask a user to confirm retrieval of content related information before the payment obligation of an additional fee occurs;

wherein a free charge or a fixed charge is set within a predetermined range and a payment obligation of an additional fee occurs when this predetermined range is exceeded during communication via said network, and wherein said retrieval section retrieves said content related information when the execution of a retrieval is instructed by said confirmation section.

2. The receiver of claim 1, wherein said retrieval section retrieves content related information from each of said one or more broadcasting channels containing said retrieval key information.

3. The receiver of claim 1, wherein said incidental information contains an artist, said content related information contains works of said artist, and said display section displays said works of said artist when the name of said artist is specified as said retrieval key information.

4. A receiving system comprising:

a receiver for retrieving content related information from a plurality of broadcasting channels, said receiver comprising a receiving section operable to receive distribution information containing program information and incidental information from said plurality of broadcasting channels, an operation section operable to designate retrieved key information corresponding to a retrieval key inputted by a user, a retrieval section operable to identify broadcasting channels with incidental information containing said retrieval key information, retrieve one or more broadcasting channels with incidental information containing said retrieval key information, and retrieve content related information from said one or more broadcasting channels with incidental information containing said retrieval key information, and a display section for displaying the content of said content related information;

an external device including a recording medium having said incidental information stored thereon, a confirmation section operable to ask a user to confirm retrieval of content related information before the payment obligation of an additional fee occurs;

wherein a free charge or a fixed charge is set within a predetermined range and a payment obligation of an additional fee occurs when this predetermined range is exceeded during communication via said network, and wherein said retrieval section is operable to retrieve said content related information from said distribution information received by said receiver when the execution of retrieval is instructed by said confirmation section and from said incidental information stored in said storage medium within said external device.

5. The receiving system of claim 4, further comprising a database containing said incidental information, which is connected to said receiver via a predetermined network, wherein said retrieval section is operable to retrieve said content related information from said distribution information received by said receiver and from said database.

6. The receiving system of claim 5, wherein said predetermined network is the Internet.

7. The receiving system of claim 5, wherein said display section displays said content related information retrieved by said retrieval section in order of time of retrieval.

8. The receiving system of claim 4, wherein, said retrieval section retrieves said content related information from said database when the execution of a retrieval is instructed by said confirmation section.

9. The receiving system of claim 4, further comprising:

a database containing said incidental information, which is connected to said receiver via a predetermined network, wherein said retrieval section is operable to retrieve said content related information from said distribution information received by said receiver, from said incidental information stored in said storage medium within said external device, and from said database.

10. The receiving system of claim 9, wherein said predetermined network is the Internet.

11. The receiving system of claim 9, wherein said display section displays said content related information retrieved by said retrieval section in order of time of retrieval.

12. A receiving method for retrieving content related information corresponding to a retrieval key by using distribution information of a plurality of broadcasting channels received, said receiving method comprising the acts of;

receiving said distribution information containing program information and incidental information;

designating retrieval key information;

identifying broadcasting channels having incidental information including said retrieval key information;

asking a user to confirm retrieval of content related information before a payment obligation of an additional fee occurs in a case;

retrieving content related information from at least one of said broadcasting channels having said incidental information including said retrieval key information; and displaying said content related information from at least one of said broadcasting channels having incidental information including said retrieval key information;

wherein a free charge or a fixed charge is set regarding within a predetermined range and a payment obligation of an additional fee occurs when this predetermined range is exceeded during communication via said network; and wherein said content related information is retrieved when the confirmation result instructs the execution of a retrieval.

13. A receiving method of claim 12, wherein said act of retrieving content related information includes retrieving content related information from each of said broadcasting channels having incidental information including said retrieval key information.

14. A receiving method of claim 12, wherein said incidental information contains an artist, said content related information contains works of said artist, and said display section displays said works of said artist when the name of said artist is specified as said retrieval key information.

15. A receiving method of claim 12, further comprising the acts of:

storing said incidental information on a storage medium; and retrieving said content related information from said received distribution information and from said storage medium.

16. A receiving method of claim 12, further comprising the acts of:

connecting to a database containing said incidental information via a predetermined network; and retrieving said content related information from said received distribution information and from said database as a target.

17. The receiving method of claim 16 wherein said predetermined network is the Internet.

18. A receiving method according to claim 12, further comprising the acts of:

storing said incidental information on a storage medium;

connecting to a database containing said incidental information via a predetermined network; and retrieving said content related information from said received distribution information, from said incidental information stored on said storage medium, and from said database.

19. A receiving method according to claim 16, wherein said retrieved content related information is displayed in order of time of retrieval.

* * * * *